No. 762,709. PATENTED JUNE 14, 1904.
G. C. HALL.
ELECTRIC MOTOR.
APPLICATION FILED MAR. 7, 1901.
NO MODEL. 2 SHEETS—SHEET 2.

Witnesses.
Chas. B. Shumway
M. Olive Williams.

Inventor.
Gaylord C. Hall
by Beach Frith
Attorneys.

No. 762,709. Patented June 14, 1904.

UNITED STATES PATENT OFFICE.

GAYLORD C. HALL, OF NEW YORK, N. Y.

ELECTRIC MOTOR.

SPECIFICATION forming part of Letters Patent No. 762,709, dated June 14, 1904.

Application filed March 7, 1901. Serial No. 50,228. (No model.)

*To all whom it may concern:*

Be it known that I, GAYLORD C. HALL, of the city, county, and State of New York, have invented a new and useful Improvement in Electric Motors, of which the following is a full, clear, and exact description when taken in connection with the accompanying drawings, which form a part thereof, and in which—

Figure 1:
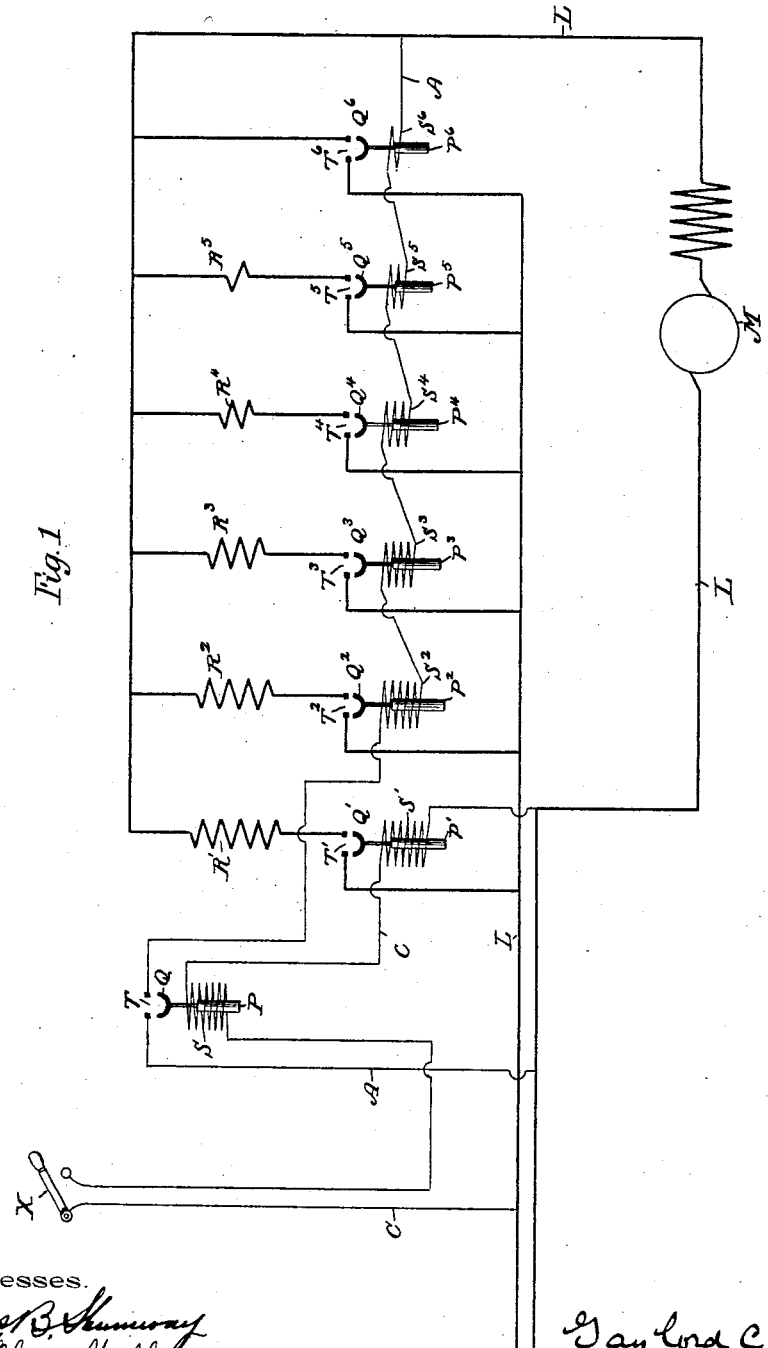
Figure 2:
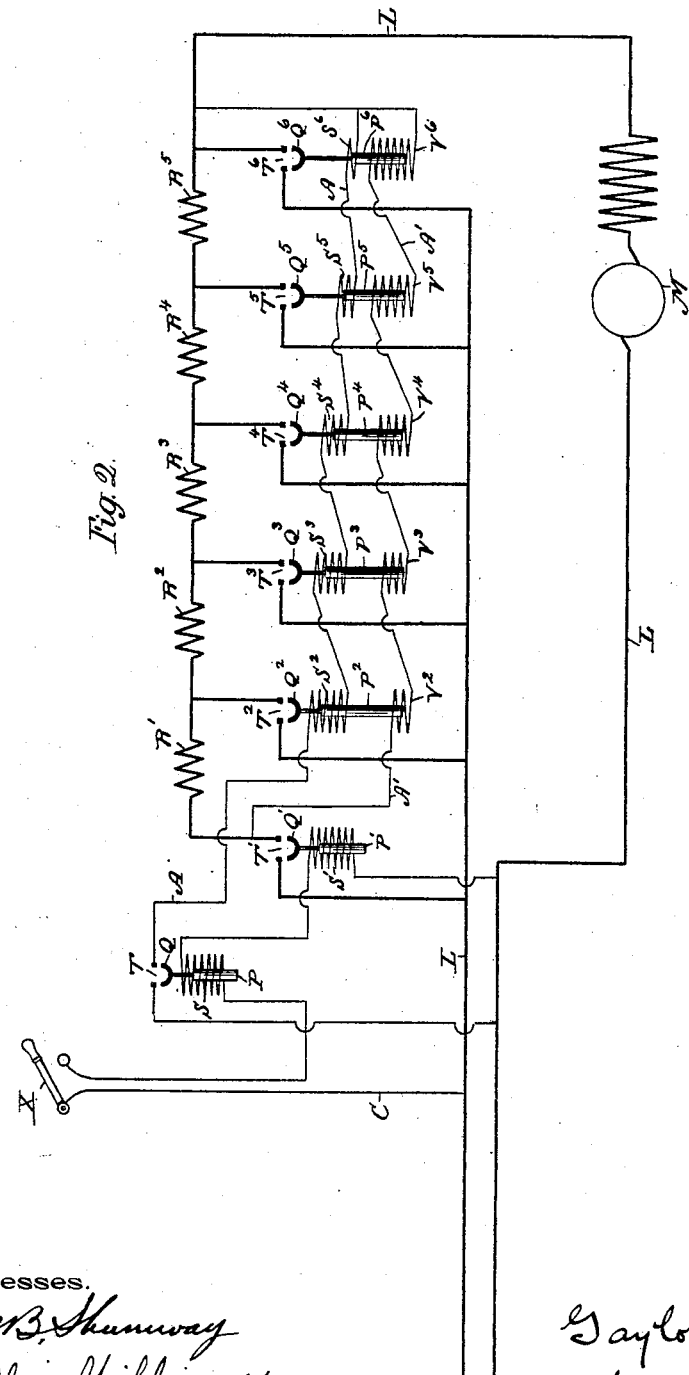

Figure 1 represents a diagram of an electric motor and associated parts embodying my invention, and Fig. 2 a modified form of the same.

In both figures similar letters of reference represent like parts.

This invention relates to electric motors, and more particularly to the method of and construction for speeding up the motor; and it consists in automatically varying the resistance in the circuit in which the motor is located by the utilization of the increased difference of potential or rise of voltage around the motor as the speed of the motor increases, the invention being herein described as applied to the gradual speeding up of a motor by decreasing the initial or starting resistance through the actuation of certain devices upon the increase of voltage around the motor through the presence of the back electromotive force generated upon the acceleration of the motor, as more fully set forth and claimed hereinafter, together with minor improvements and combinations of parts. To this end a secondary or supplementary circuit is shunted around the motor, which as the potential around the motor is increased actuates the devices or apparatus for cutting out or decreasing the resistance or resistances (in the form of rheostats or otherwise) located in the main circuit.

Referring to the drawings, the letter L represents the main line or circuit, and M the motor in said circuit.

$R' R^2 R^3 R^4$, &c., represent a number of rheostats or resistances located in the main circuit, the particular form or arrangement of which may be varied. The main circuit L is provided with a plurality of switches $T' T^2 T^3 T^4$, &c., having contact devices $Q' Q^2 Q^3 Q^4$, &c., so located in relation to the resistances $R' R^2 R^3 R^4$, &c., that the making or breaking of each switch varies the strength of the resistance in the main circuit. These contact pieces or devices for varying the resistance in the main circuit are actuated by the rise of voltage around the motor by the following mechanism, which is a simple and preferred construction, although the invention is not intended to be limited thereto: A secondary circuit, herein called the "positive-action" circuit A, is shunted around the motor M, not around the resistances $R' R^2 R^3 R^4$, &c., and in this circuit A are located one or more solenoids or coils $S^2 S^3 S^4$, &c., each of which actuates a plunger $P^2 P^3 P^4$, &c., or other suitable device. Each plunger is shown connected at one end with one of the contact devices $Q^2 Q^3 Q^4$, &c., for closing one of the switches $T^2 T^3 T^4$, &c. By the variation in the number of turns of wire in the different coils $S^2 S^3 S^4$, &c., the current necessary to actuate one plunger, such as $P^2$, may be less than that necessary to actuate another plunger, as $P^3$, so that the plungers will be actuated successively as the current in the positive-action circuit A increases, the increase corresponding to the increase of potential around the motor M. By this means as the voltage around the motor increases the contact-pieces $Q^2 Q^3 Q^4$, &c., will be successively actuated to close their respective switches $T^2 T^3 T^4$, &c., and this action will decrease the resistance in the main circuit.

The main circuit is first made by the switch T', which is herein shown as controlled by a controlling-circuit C, in which is located a starting-switch X. In the controlling-circuit C is located a solenoid or coil S', which actuates a plunger P', having connected therewith the contact device Q' for closing the switch T'. When upon the closing of the starting-switch X the plunger P' is actuated by the coil S' and the contact device Q' closes the switch T', the motor is started with its initial or starting resistance. As its speed increases by the back electromotive force generated thereby the voltage around the motor is increased over that present on starting, and the current in the positive-action circuit A is correspondingly increased. This increase of current in the positive-action circuit A is sufficient to actuate one of the plungers, such as $P^2$, through its corresponding coil $S^2$, (this coil having the greatest number of turns of any of the coils in the positive-action circuit,) and by the operation of the plunger $P^2$ the contact device $Q^2$ closes the switch $T^2$, and the resistance in the main line thereby is decreased, as indicated. Upon this decrease of resistance in the main circuit the speed of the motor is increased, which, with the further back electromotive force thereby developed, increases the voltage around the motor and the positive-action circuit A, so that another plunger, as $P^3$, is actuated by its coil $S^3$ and the switch $T^3$ is closed, tending to further reduce the resistance in the main circuit. The operation may be repeated with successive plungers until the resistances are reduced to a minimum and the maximum speed of the motor obtained.

A switch T is provided to make or break the positive-action circuit C. Upon closing the switch X a plunger P, connected to a contact device Q for closing the switch T, is actuated by a solenoid or coil S, located in the controlling-circuit C, so that when the starting-switch X is closed the positive-action circuit A is thus closed and remains so until the switch X is opened. When the switch X is opened, the circuit A is broken, which allows the plungers $P^2$ $P^3$ $P^4$, &c., to fall, thus opening the switches $T^2$ $T^3$ $T^4$, &c. As described above, the coil $S'$ is also controlled by the switch X, so that when the switch X is opened all the switches in the main circuit are opened, thus stopping the motor.

In Fig. 2 is shown a modified form of the invention embracing a further improvement whereby the contact pieces or devices for varying the resistance are actuated not merely by the increase in voltage around the motor, but by the relation of this voltage to or its difference from that around the resistances. To this end a circuit, herein called the "retarding-action" circuit $A'$, is shunted around the resistances and has located therein solenoids or coils $V^2$ $V^3$ $V^4$, &c., each acting upon one of the plungers $P^2$ $P^3$ $P^4$, &c., but in the opposite direction from the solenoids or coils $S^2$ $S^3$ $S^4$, &c. By this means each of the plungers $P^2$ $P^3$ $P^4$, &c., is acted upon by two coils or solenoids, respectively, as $S^2$ and $V^2$, $S^3$ and $V^3$, $S^4$ and $V^4$, &c., of which that in the positive-action circuit A tends to shift the plunger and contact device to close the switch $T^2$ $T^3$ $T^4$, &c., while that in the retarding-action circuit $A'$ tends to hold the plunger and contact device away from the switch. As indicated by the number of turns in the various coils, one of the positive-action coils, as $S^2$, may be arranged to require less current to shift its plunger by overcoming the action of its corresponding retarding-action coil $V^2$ than another coil, as $S^3$, in overcoming its corresponding retarding-action coil $V^3$. This difference may be accentuated by varying the ratio of the turns in the different retarding-action coils $V^2$ $V^3$ $V^4$, &c., to those of their corresponding positive-action coils $S^2$ $S^3$ $S^4$, &c., to suit the conditions. With this construction the voltage around the motor need not be increased to any certain amount to operate all the plungers, but need merely attain a certain prescribed relation to that around the resistances, or, in other words, irrespective of what the exact voltage in the main circuit be (within certain limits) when a certain fractional portion thereof is around the motor, with the remainder around the resistances, the several devices for decreasing the resistance will be actuated.

In case a shunt-wound motor were used the positive-action circuit would be shunted around the armature of the motor.

Having now described my invention, (which may vary in its details without departing from the spirit thereof,) what I claim, and desire to secure by Letters Patent, is—

1. The combination with a main circuit containing a motor and a resistance; of a shunt-circuit containing the starting-switch; and a positive-action circuit shunted about the motor and closed and broken by said shunt-circuit, substantially as described.

2. The combination with a main circuit containing a motor and resistance; of a shunt-circuit containing the starting-switch; a positive-action circuit shunted around the motor and closed or broken by said shunt-circuit; and devices for varying the resistance controlled by the current in said positive-action circuit, substantially as described.

3. The combination with a main circuit containing a motor and resistance; of means for varying the resistance oppositely actuated by the difference of potential around the motor and the difference of potential around the resistance, substantially as described.

4. The combination with a main circuit containing a motor and resistance; of a positive-action circuit shunted around the motor; a retarding-action circuit around the resistance; devices for varying the resistance oppositely actuated by the current in the positive-action circuit and the current in the retarding-action circuit, substantially as described.

5. The combination with a main circuit containing a motor and resistance; of a positive-action circuit shunted around the motor; a retarding-action circuit shunted around the resistance; a series of devices oppositely actuated by the current in the positive-action circuit and the current in the retarding-action circuit, the successive devices being actuated by different degrees of strength in said currents, substantially as described.

6. The combination with a main circuit, containing a motor and resistance; of a supplementary circuit shunted around the motor; devices for varying the resistance controlled by the current in the shunt-circuit; and means for making and breaking the main current and shunt-circuit simultaneously, substantially as described.

In witness whereof I have hereunto set my hand on the 4th day of March, 1901.

GAYLORD C. HALL.

Witnesses:
 LINCOLN A. STUART,
 HJALMAR WALLERSTADT.